US012687210B1

(12) United States Patent
Taha et al.

(10) Patent No.: US 12,687,210 B1
(45) Date of Patent: Jul. 21, 2026

(54) COMPOSITE TAPE SPRING WITH ENGINEERED DEPLOYMENT ENERGY USING NANOPARTICLES AND METHODS OF MAKING

(71) Applicant: STC Rainforest Innovations, Albuquerque, NM (US)

(72) Inventors: Mahmoud Reda Taha, Albuquerque, NM (US); Mark R. Scherbarth, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 1166 days.

(21) Appl. No.: 17/062,393

(22) Filed: Oct. 2, 2020

Related U.S. Application Data

(60) Provisional application No. 62/909,463, filed on Oct. 2, 2019.

(51) Int. Cl.
*B64G 1/22* (2006.01)
*B32B 5/06* (2006.01)
*B82Y 30/00* (2011.01)
*F16F 1/18* (2006.01)

(52) U.S. Cl.
CPC ............... *F16F 1/185* (2013.01); *B32B 5/06* (2013.01); *B82Y 30/00* (2013.01); *B32B 2250/03* (2013.01); *B32B 2307/51* (2013.01)

(58) Field of Classification Search
CPC ......... B29C 70/08; B29C 70/083; B64G 1/22; B32B 5/06; B32B 5/08; B32B 2250/03; B32B 2307/51; F16F 1/185; B82Y 30/00

USPC ....................................... 267/141.1, 158–162
See application file for complete search history.

(56) References Cited

U.S. PATENT DOCUMENTS

| | | | | |
|---|---|---|---|---|
| 4,278,726 | A * | 7/1981 | Wieme .................. | B29C 70/083 |
| | | | | 267/141.1 |
| 5,030,490 | A * | 7/1991 | Bronowicki ............. | B64G 1/22 |
| | | | | 428/113 |
| 5,063,098 | A * | 11/1991 | Niwa ...................... | B32B 27/08 |
| | | | | 428/76 |
| 5,213,879 | A * | 5/1993 | Niwa ...................... | B32B 7/022 |
| | | | | 428/492 |
| 5,695,867 | A * | 12/1997 | Saitoh ..................... | B32B 15/04 |
| | | | | 428/492 |
| 5,712,038 | A * | 1/1998 | Yamazaki ............. | F16F 1/3605 |
| | | | | 428/339 |
| 5,858,521 | A * | 1/1999 | Okuda ..................... | B32B 7/12 |
| | | | | 428/492 |
| 7,354,033 | B1 * | 4/2008 | Murphey ............... | B64G 1/222 |
| | | | | 52/653.2 |
| 8,450,225 | B2 * | 5/2013 | Restuccia ................ | B32B 5/08 |
| | | | | 442/175 |
| 9,511,571 | B2 * | 12/2016 | Montgomery .......... | B29C 70/08 |

FOREIGN PATENT DOCUMENTS

| | | | | | |
|---|---|---|---|---|---|
| CN | 209098565 U | * | 7/2019 | ............. | B29C 70/88 |
| JP | 63168802 | * | 11/1988 | ............... | G01B 3/10 |
| WO | WO-02087858 A2 | * | 11/2002 | ........... | B29C 70/086 |

* cited by examiner

*Primary Examiner* — Christopher P Schwartz
(74) *Attorney, Agent, or Firm* — Keith Vogt; Keith Vogt, Ltd.

(57) ABSTRACT

A tape spring having an elastic layer located in between one or more viscoelastic layers to form an elongated tape spring having a longitudinal axis.

5 Claims, 3 Drawing Sheets

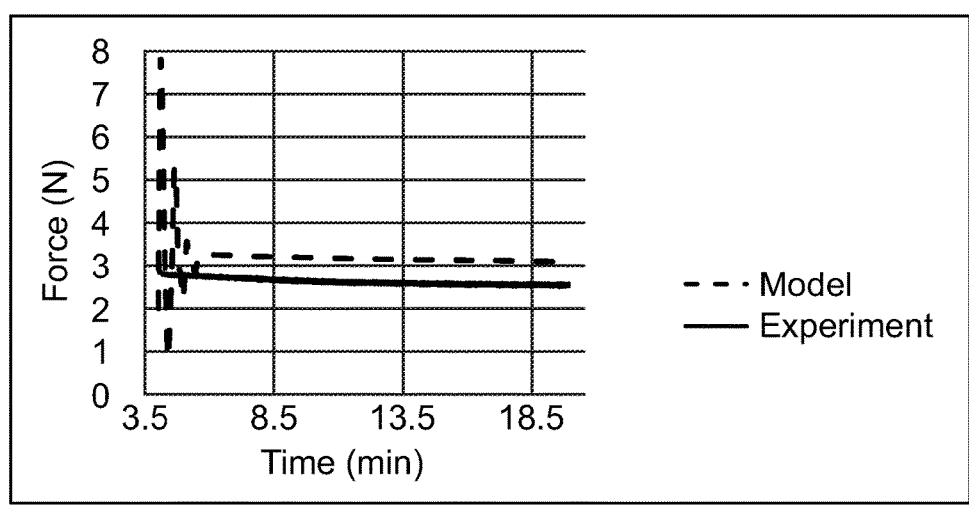
FIG. 4
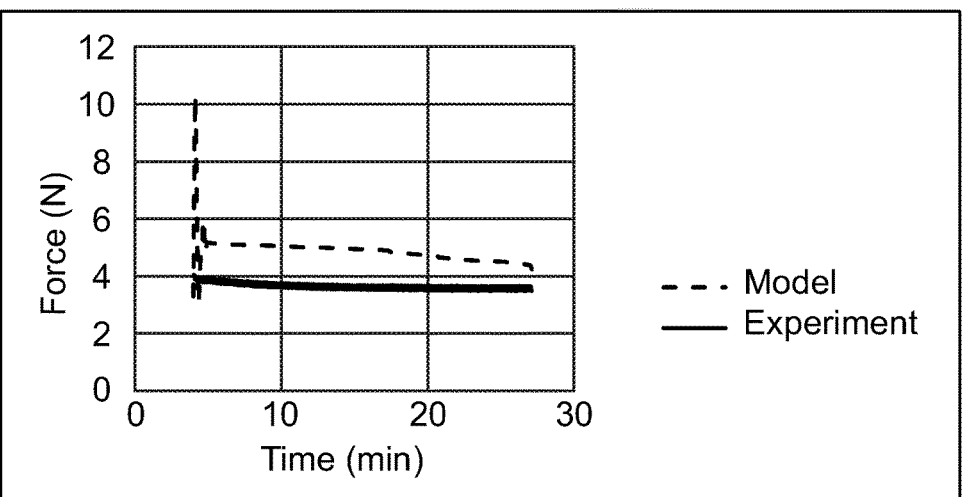
FIG. 5
| Stowage Time | Control Group (%) | Nanoalumina Group (%) | % Nano < Control |
|---|---|---|---|
| 1 Hour | 36.6 | 7.1 | 80.6 |
| 1 Day | 17.3 | 7.1 | 59.0 |
| 1 Week | 23.9 | 12.1 | 49.4 |
| 1 Month | 14.6 | 11.9 | 18.7 |
| 6 Months | 12.2 | 9.4 | 22.5 |
| Average Loss in Deployment Force (N) at Tape Spring Tip (%) | 20.9 | 9.5 | |
FIG. 6

| Stowage Time | Control Group | | Nanoalumina Group | |
|---|---|---|---|---|
| | Beginning | End | Beginning | End |
| 1 Hour | 2.36 | 1.49 | 5.31 | 4.93 |
| 1 Day | 2.07 | 1.71 | 4.98 | 4.63 |
| 1 Week | 3.27 | 2.49 | 4.83 | 4.25 |
| 1 Month | 2.71 | 2.32 | 4.29 | 3.78 |
| 6 Months | 2.85 | 2.50 | 4.15 | 3.76 |
| Average Loss in Deploymemt Force (N) at Tape Spring Tip (%) | 17.3 | | 9.4 | |

| Element | Mass % | Atom % |
|---|---|---|
| C | 44.88 | 77.63 |
| O | 11.34 | 14.72 |
| Al | 0.16 | 0.12 |
| Si | 3.07 | 2.27 |
| Nb | 8.23 | 1.84 |
| Au | 32.32 | 3.42 |
| Total | 100.00 | 100.00 |

COMPOSITE TAPE SPRING WITH ENGINEERED DEPLOYMENT ENERGY USING NANOPARTICLES AND METHODS OF MAKING

RELATED APPLICATIONS

This application claims priority to U.S. Provisional Application No. 62/909,463, filed on Oct. 2, 2019, which is incorporated herein in its entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Tape springs are thin, elongate structures that are designed to store energy in the rolled state and exert energy when unfurled. Special geometry design is used to ensure appropriate folding and deployment. External influences such as stress relaxation, creep, heat, and radiation, all contribute to the degradation of the device's capacity to release energy it stored during folding.

SUMMARY OF THE INVENTION

In one embodiment, the present invention concerns a tape spring having nanoparticles wherein the nanoparticles control stress relaxation/creep and thus deployment energy in the spring.

In other embodiments, the present invention concerns a tape spring having alumina nanoparticles (ANPs) wherein the ANPs control stress relaxation/creep in the spring.

In other embodiments, the present invention concerns tape springs wherein the tape springs are composite laminate structures.

In other embodiments, the present invention concerns tape springs wherein the rheological and mechanical properties of the ANP composites can be tailored, thereby enabling controlled passive deployment of space structures by controlling ANP wt. %, constituent materials and composite layup.

In other embodiments, the present invention concerns tape springs wherein the ANPs enable improved bond, increased stiffness, controlled deployment, enhanced fatigue life and resistance to space environment radiation and thermal degradation.

In other embodiments, the present invention concerns tape springs wherein using ANPs enable superior aerospace composite structures.

In other embodiments, the present invention concerns tape springs engineered using ANPs that have reduced stress relaxation.

In other embodiments, the present invention concerns tape springs engineered using ANPs that have 55% less deployment force as compared with conventional springs.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIGS. 4 and 5 illustrate how an embodiment of the present invention performs as compared to a control after one month of stowage, with FIG. 4 showing the results of the control and FIG. 5 showing the results of a tape spring of the present invention.

FIG. 6 illustrates the average % loss in deployment force during stowage of tape springs of the present invention.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

In one embodiment the present invention provides a method and system that extends the useful life of a tape spring by the use of nanoparticles such as Alumina Nanoparticles (ANP). Adding ANPs to composite laminate structure tape springs can control stress relaxation/creep of the spring.

Figure 1:
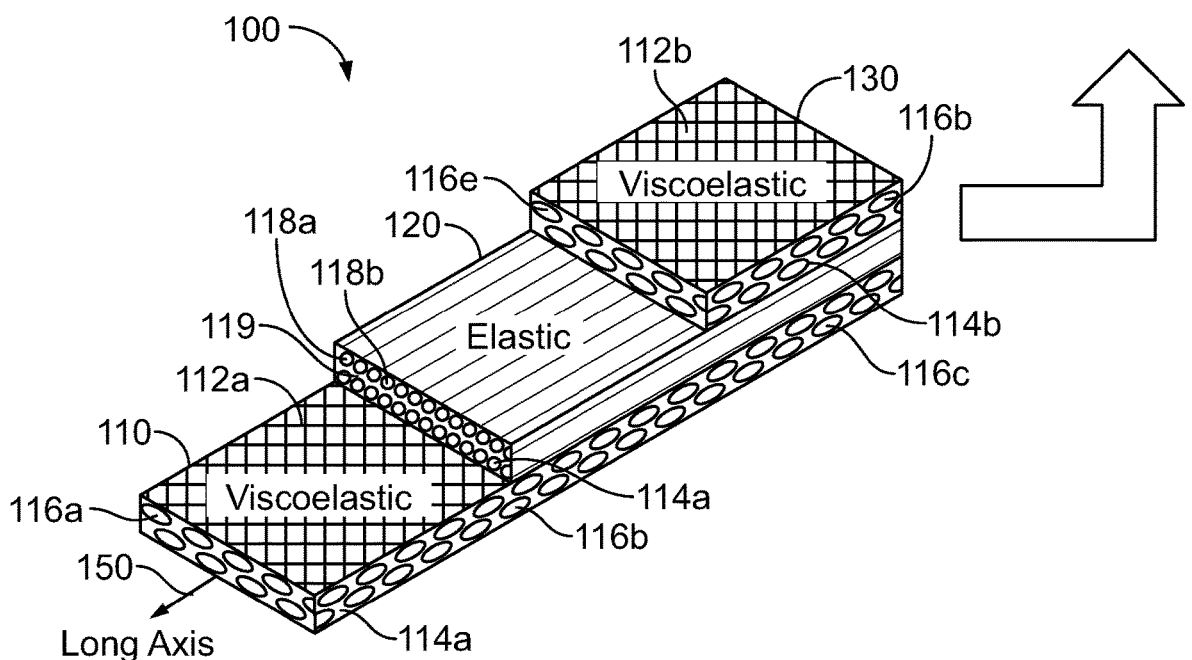
FIG. 1 illustrates an embodiment of the present invention.
Figure 2:
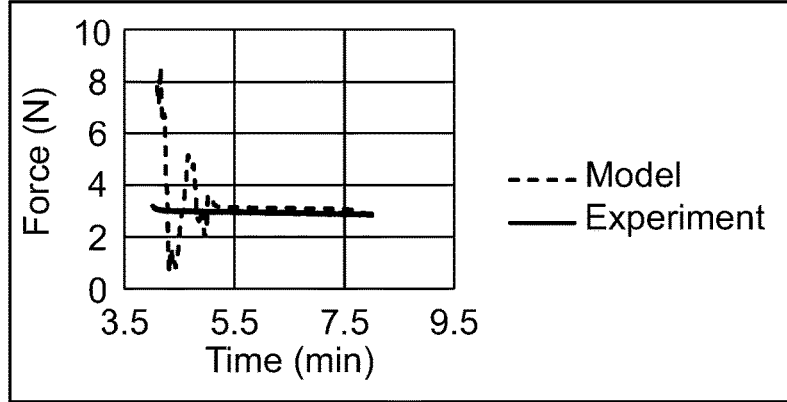
FIGS. 2 and 3 illustrate how an embodiment of the present invention performs as compared to a control after one week of stowage, with FIG. 2 showing the results of the control and FIG. 3 showing the results of a tape spring of the present invention.
Figure 3:
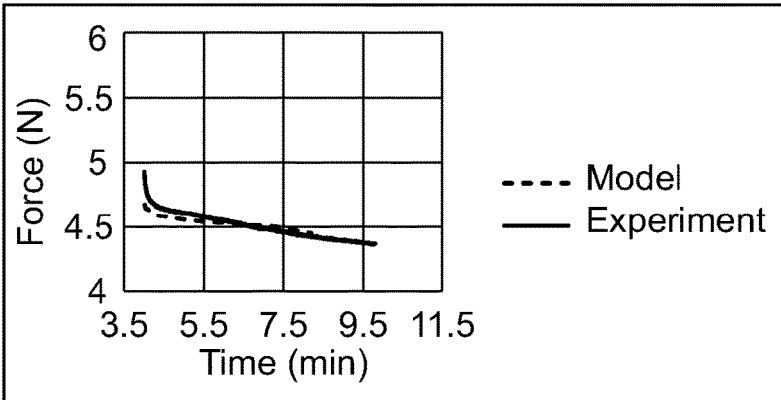

As shown in FIG. 1, the present invention in one embodiment is comprised of tape spring 100 having a plurality of layers 110, 120 and 130. Layers 110 and 130 are viscoelastic by having viscous and elastic characteristics when undergoing deformation. Layer 120 is elastic in that the material undergoes a temporary shape change that is self-reversing after a deforming force is removed.

In a preferred embodiment, layers 110 and 130 are a composite of one or more silica grade fabrics 112A and 112B, epoxy 114A and 114B and nanoparticles 116A, 116B, 116C, 116D and 116E. In other preferred embodiments, nanoparticles 116A, 116B, 116C, 116D and 116E are alumina nanoparticles (ANPs). In yet other preferred embodiments, layers 110 and 130 include 2% weight ANP.

Layers 114A and 114B may be a plain weave carbon fiber fabric preimpregnated with an epoxy resin. The fibers are oriented at ±45° to the longitudinal axis 150 of tape spring 100.

Layer 120 includes a plurality of unidirectional carbon fibers 118A and 118B pre-impregnated with an epoxy resin 119. The fibers run parallel with longitudinal axis 150 of tape spring 100.

In one embodiment, the arrangement of the layers is symmetric, with layers 110 and 130 sandwiching layer 120. Outer layers 110 and 130 may also be located an equal distance from layer 120. The unidirectional fibers in layer 120 provide high axial stiffness and bending stiffness, limited thermal expansion, and creep resistance. The off-axis plain weave fibers 114A and 114B add shear stiffness and local bending stiffness.

In other embodiments, different arrangements of the layers may be used. For example, layers 110, 120 and 130 may be a repeating unit. In other arrangements, multiple elastic layers may be used with one or more located in between one or more viscoelastic layers.

Also, the rheological and mechanical properties of ANP composites used with the embodiments of the present invention can be tailored enabling passive deployment of space structures by controlling ANP wt. %, constituent materials, and composite layup.

The use of nanoparticles such as ANPs in composite tape springs results in improved bond, increased stiffness, enhanced fatigue life, controlled deployment and resistance to space environment radiation and thermal degradation.

Tape springs engineered using ANPs produce superior aerospace composite structures as shown and demonstrated in FIGS. 2-7. For example, ANPs reduce stress relaxation in structures. This may result in a 55% less deployment force for ANP tape springs as compared with conventional springs. The results shown in FIGS. 2-7 are for Dynamic Mechanical Analyzation (DMA) Testing conducted on neat epoxy and ANP-doped epoxy of the present invention for determination of short-term dynamic behavior of ANP epoxy. All tape springs rolled onto hub for varying stowage times to analyze stress relaxation with stowage times of 1 Hour, 1 Day, 1 Week, 1 Month, 6 Months.

Figures 7, 8, 9:
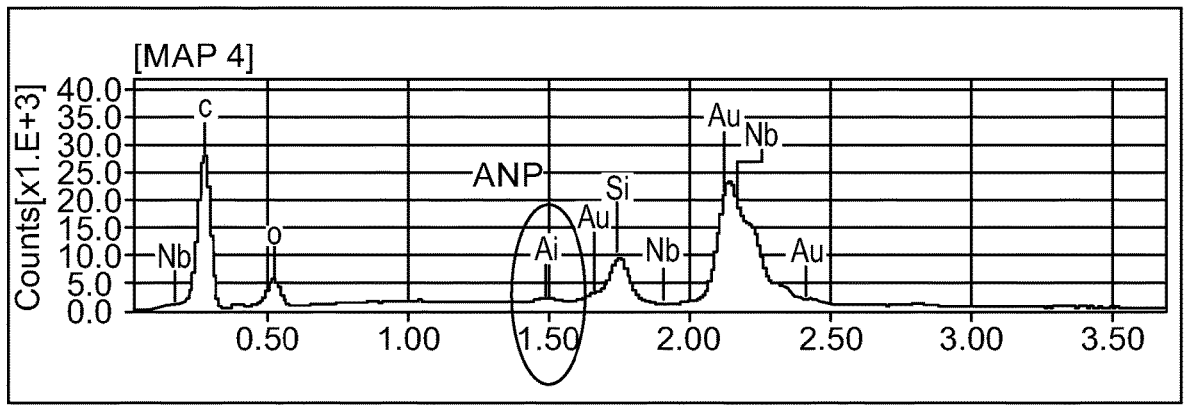
FIG. 7 illustrates the average load recordings at beginning and end of tape springs' stowage for embodiments of the present invention.
FIG. 8 illustrates a SEM/EDS testing for embodiments of the present invention.
FIG. 9 illustrates an elemental composition of an embodiment of the present invention.

FIGS. 8 and 9 show the Scanning Electron Microscope (SEM)/Energy Dispersive Spectroscopy (EDS) testing conducted to examine and analyze the microstructure of ANP structures of the present invention as well as the composition.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A device for storing energy for the deployment of a structure comprising:
   a tape spring, said tape spring comprised of an elastic layer located in between one or more viscoelastic layers to form an elongated tape spring having a longitudinal axis;
   said tape spring including a plurality of alumina nanoparticles located in said viscoelastic;
   said tape spring having a rolled state and an unfurled state;
   in said rolled state said tape spring stores energy;
   in said unfurled state said tape spring exerts energy and deploys a structure; and
   wherein said alumina nanoparticles reduce the long-term creep and stress relaxation effects of radiation and thermal degradation.

2. The device of claim 1 wherein said elastic layer includes unidirectional carbon fibers held in place by epoxy, said fibers run parallel to said longitudinal axis.

3. The device of claim 2 wherein one or more said viscoelastic layers include one or more carbon fiber fabrics.

4. The device of claim 3 wherein said one or more viscoelastic layers include one or more carbon fiber fabrics, aid fabric comprising a plurality of fibers oriented at ±45° to said longitudinal axis.

5. The device of claim 1 wherein said nanoparticles are 2% weight alumina nanoparticles.

* * * * *